(12) United States Patent
Blanc et al.

(10) Patent No.: US 9,618,736 B2
(45) Date of Patent: Apr. 11, 2017

(54) METHOD AND DEVICE FOR CORRECTING THE THERMOELASTIC EFFECTS, NOTABLY FOR A SPACE TELESCOPE, AND TELESCOPE COMPRISING SUCH A DEVICE

(71) Applicant: THALES, Neuilly-sur-Seine (FR)

(72) Inventors: Jean-Francois Blanc, Mandelieu (FR); Olivier Chanal, Cannes la Bocca (FR); Arnaud Liotard, Grasse (FR); Damiana Losa, Antibes (FR); Catherine Charbonnel, La Roquette-sur-Siagne (FR); Christophe Devilliers, Grasse (FR)

(73) Assignee: THALES, Courbevoie (FR)

( * ) Notice: Subject to any disclaimer, the term of this patent is extended or adjusted under 35 U.S.C. 154(b) by 100 days.

(21) Appl. No.: 13/912,031

(22) Filed: Jun. 6, 2013

(65) Prior Publication Data
US 2013/0329286 A1    Dec. 12, 2013

(30) Foreign Application Priority Data
Jun. 8, 2012    (FR) ..................... 12 01651

(51) Int. Cl.
*G02B 23/00* (2006.01)
*G02B 23/06* (2006.01)
(Continued)

(52) U.S. Cl.
CPC ............. *G02B 23/06* (2013.01); *G02B 7/008* (2013.01); *G02B 7/185* (2013.01); *G02B 23/00* (2013.01); *G02B 26/0825* (2013.01)

(58) Field of Classification Search
CPC ........ G02B 13/14; G02B 23/00; G02B 13/18; G02B 13/146; G02B 13/22; H01Q 1/125;
(Continued)

(56) References Cited

U.S. PATENT DOCUMENTS

| 7,053,828 B1* | 5/2006 | Goodzeit ............. H01Q 3/26 342/359 |
| 2009/0321579 A1* | 12/2009 | Dorman .............. B64G 1/1085 244/158.6 |
| 2012/0038981 A1* | 2/2012 | Dopilka ............... G02B 7/183 359/419 |

OTHER PUBLICATIONS

D. Laubier, et al., "Feasibility Demonstration of a High Performance Compact Telescope", ACTA Astronautica, Jan. 1, 2000, pp. 279-286, vo. 46, Nos. 2-6, Pergamon Press, Elmsford, GB, XP026001352.*

(Continued)

*Primary Examiner* — Scott J Sugarman
*Assistant Examiner* — Sharrief Broome
(74) *Attorney, Agent, or Firm* — Baker & Hostetler LLP

(57) ABSTRACT

A method for correcting the thermoelastic effects on performance parameters of a telescope on board a space satellite, comprises a first step prior to the flight of the satellite consisting in determining, a priori, a correction of the thermoelastic effects by using a prior model of variations of the thermoelastic effects on the orbital scale and an algorithm for determining correction fed by programming data of the space satellite, and a second step carried out in flight, based on the correction determined a priori, consisting in establishing control messages of correction means for correcting the performance parameters of said telescope.

14 Claims, 3 Drawing Sheets

(51) Int. Cl.
  *G02B 7/00*   (2006.01)
  *G02B 7/185*  (2006.01)
  *G02B 26/08*  (2006.01)

(58) Field of Classification Search
  CPC ........ H01Q 1/1257; H01Q 3/08; H01Q 1/246;
       H01Q 1/28; H01Q 1/2291; H01Q 1/32;
       H01Q 21/06; H01Q 21/08; H01Q 21/24;
       H01Q 21/28; H01Q 25/00; H01Q 25/005
  USPC ............... 359/425, 399, 410, 506, 362, 356;
                                              342/75, 77
  See application file for complete search history.

(56) References Cited

OTHER PUBLICATIONS

John Leif Jorgensen, et al., "The PROBA Satellite Star Tracker Performance", ACTA Astronautica, Jan. 1, 2005, pp. 153-159, vol. 56, Nos. 1-2, XP027747109.*

D. Laubier, et al., "Feasibility Demonstration of a High Performance Compact Telescope", ACTA Astronautica, Jan. 1, 2000, pp. 279-286, vol. 46, Nos. 2-6, Pergamon Press, Elmsford, GB, XP026001352.*

G. Aridon, et al., "On the correction Capability of a Deployed Tape-Spring Hexopod", Science Direct—Mechanism and Machine Theory, Jun. 10, 2008, pp. 1009-0123, vol. 43, No. 8, XP022711040.

* cited by examiner

METHOD AND DEVICE FOR CORRECTING THE THERMOELASTIC EFFECTS, NOTABLY FOR A SPACE TELESCOPE, AND TELESCOPE COMPRISING SUCH A DEVICE

CROSS-REFERENCE TO RELATED APPLICATION

This application claims priority to foreign French patent application No. FR 1201651, filed on Jun. 8, 2012, the disclosure of which is incorporated by reference in its entirety.

FIELD OF THE INVENTION

The present invention relates to a method and a device for correcting the thermoelastic effects, notably for a space telescope and a telescope comprising such a device. It applies notably to telescopes on board space satellites.

BACKGROUND

In the context of a future-generation high-resolution observation instruments, there is a need to increase the resolution and the associated performance while reducing their bulk. The image-quality performance concerned is the modulation transfer function commonly designated by the acronym "MTF" and location. For the rest of this description, the term "instruments" means all the devices forming a space telescope, that is to say the telescope itself, at least one focal plane and optomechanical devices or specific measuring devices.

The MTF is representative of the quality of the image produced by the instruments and improving it involves corrections. The location is representative of the capability of the instruments to determine the coordinates of a target point in a frame of reference of the satellite. Improving the location simply involves a good knowledge of the latter.

Improving the resolution involves producing a larger telescope pupil involving mirrors with larger diameters. Really, the mirrors used are increasingly sensitive having an increasingly greater relative thinness and consequently are less stable. In parallel, for the purposes of economy, the launches have to be ever smaller, involving a need for instruments that are increasingly compact. This phenomenon further increases the sensitivity of the instruments.

The increased sensitivity of the instruments causes their performance to drift, notably over the long term, and typically means that the latter must be able to be readjusted in flight. Moreover, the increased sensitivity of the instruments makes the latter greatly subject to the variations of thermal flux on the orbital scale, bringing with it major performance instabilities, notably in terms of MTF and location. The thermoelastic variations originate from the flux variations that the telescope cavity undergoes: of terrestrial, spatial or solar origin, according to what the cavity undergoes. The impact of these effects on image-quality performance may be intense, particularly for compact telescopes in which the inter-lens distance is reduced, or else for deployable telescopes because of their greater structural instability.

According to known techniques, the instruments can be designed so as to have a compatible sensitivity—hence a bulk—of the allocated instabilities. In the same manner, the technologies for producing the instruments can be chosen for their compatibility with these instabilities.

For the purpose of making the instruments more compact in order to reduce the launch costs, while increasing their performance, known techniques also make it possible to correct the defects when the satellite is in orbit. These techniques are used in instruments known as "active". An active instrument typically comprises a device for measuring the defects, correction devices, such as devices moving mirrors, or the deformation of the optical surface, etc. The correction cycle depends on the frequency of change of the defects.

The defects associated with the changes of environment between the ground and flight, such as the effects associated with gravity or the effects associated with the launch loads are to be corrected at the beginning of orbital life. The defects associated with the long term change in flight, notably due to the phenomena of radiation and to aging are to be corrected over long, typically annual, cycles.

The short-term effects on the orbital scale require a complex, rapid correction loop, carrying out a virtually real-time closed-loop control. This rapid correction loop must in a few tens of seconds measure the defects, calculate the correction to be applied and correct the defects, while performing the nominal mission of the telescope which consists in taking images.

The short-term effects are essentially of thermoelastic origin.

SUMMARY OF THE INVENTION

One aim of the present invention is to alleviate at least the aforementioned drawbacks by proposing a method taking account of the effect of the thermoelastic drift on the orbital scale on the MTF but also advantageously on the location, that is to say on the stability on the line of sight.

Accordingly, the subject of the invention is a method for correcting the thermoelastic effects on performance parameters of a telescope on board a space satellite, comprising a first step prior to the flight of the satellite consisting in determining, a priori, a correction of the thermoelastic effects by using a prior model of variations of the thermoelastic effects on the orbital scale and an algorithm for determining correction fed by programming data of the space satellite, and a second step carried out in flight, based on the correction determined a priori, consisting in establishing control messages of correction means for correcting the performance parameters of said telescope.

In one embodiment of the invention, the correction method may also comprise a third step carried out in flight, consisting in measuring in flight performance parameters of the telescope and in carrying out a resetting of the prior model of variations of the thermoelastic effects, the resetting being carried out in flight on the basis of the difference between the performance parameters in the prior model and the corresponding performance parameters originating from the measurements.

In one embodiment of the invention, said performance parameters may comprise the focusing of the telescope.

In one embodiment of the invention, the prior model of variation of the thermoelastic effects is a periodic predictive model.

In one embodiment of the invention, said performance parameters may comprise the stability of the line of sight of the telescope.

In one embodiment of the invention, said measurements may comprise the measurement of at least one Zernike parameter.

In one embodiment of the invention, said measurements may be carried out during each orbit of the satellite.

In one embodiment of the invention, said measurements may be carried out during a first half-orbit of the satellite, and the resetting of the prior model of variations of the thermoelastic effects may be carried out during a second half-orbit of the space satellite.

In one embodiment of the invention, said measurements may be carried out over predetermined time periods.

A further subject of the present invention is a device for correcting the thermoelastic effects on performance parameters of a space telescope on board a space satellite, the device being configured for the use of the correction method according to any one of the embodiments presented.

In one embodiment of the invention, the correction device may comprise calculation means comprising a prior model of variations of the thermoelastic effects and an algorithm for determining correction fed by programming data of the space satellite and correction means for correcting the performance parameters acting on the telescope.

In one embodiment of the invention, the correction device may also comprise in-flight measurement means for measuring the performance parameters of the telescope.

In one embodiment of the invention, the correction means may comprise means for moving at least one mirror of the telescope designed to ensure the movement and/or the orientation of said at least one mirror.

In one embodiment of the invention, the correction means may comprise means for deforming said at least one mirror of the telescope.

A further subject of the present invention is a telescope for a space satellite comprising a correction device according to any one of the embodiments presented.

BRIEF DESCRIPTION OF THE DRAWINGS

Other features and advantages of the invention will appear on reading the description, given as an example, made with respect to the appended drawings which represent.

DETAILED DESCRIPTION

Figure 1:
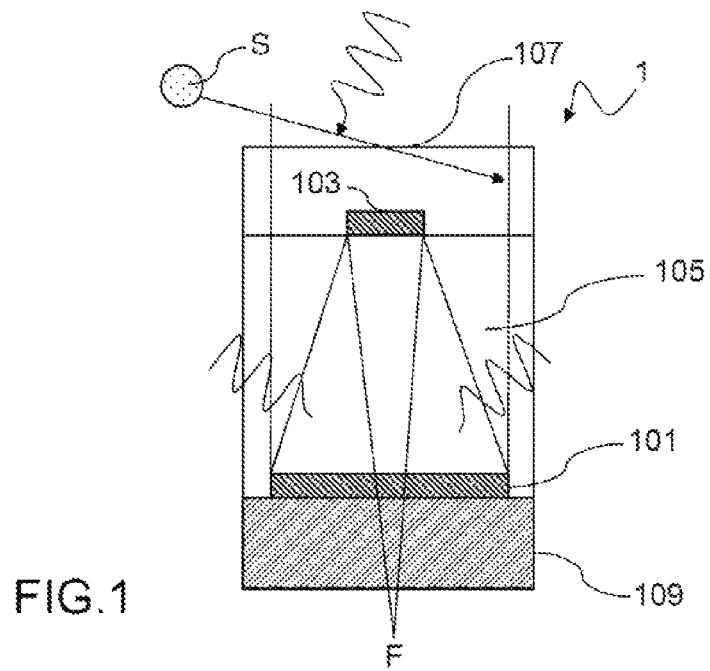
FIG. 1, a diagram illustrating in overview the structure of an instrument in the context of the present invention.

FIG. 1 shows a diagram illustrating in overview the typical structure of an instrument in the context of the present invention.

Typically, an instrument comprises a telescope 1 comprising a primary mirror 101, a secondary mirror 103, the primary mirror 101 being placed substantially at the back of a front cavity 105 or "cavity of the telescope". The telescope 1 also comprises substantially in its upper portion a sun baffle 107. The telescope 1 also comprises an optical bench 109, forming a structure supporting the primary mirror 101 and including in its lower portion other optical elements not shown in the figure. The configuration of the primary mirror 101 and secondary mirror 103 defines an image focus point F in which the light is focused, the image focus point F typically being situated in its lower portion.

In FIG. 1, the various thermal fluxes: originating from space and internally from the cavity of the telescope, are represented by zigzag lines.

As described above, the thermal drifts are due to the flux variations inside the front cavity 105 of the telescope 1. The latter depend mainly on the attitude of the satellite, that is to say the direction that the front cavity 105 sees. In geocentric pointing, that is to say when the satellite 10 points toward the earth, the front cavity 105 is subjected to a flux originating from the reflection of the solar rays on the surface of the earth, called "albedo flux" and the thermal flux of the earth; in heliocentric pointing, that is to say when the satellite 10 points its solar generators toward the sun S, the front cavity 105 is subjected to a flux called "space flux". The satellite travels in succession over day time and night time earth zones.

The visible shots take place on the daytime half-orbit, outside the polar zones. Typically, between the shots, the satellite is repositioned in heliocentric configuration in order to maximize the capture of solar energy.

Figure 2:
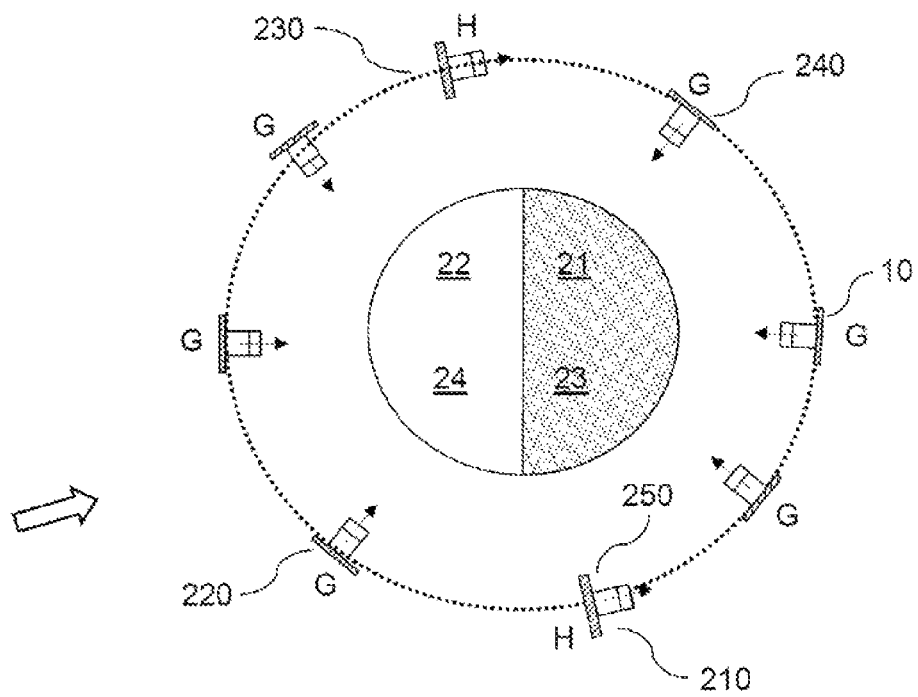
FIG. 2, a diagram illustrating an example of change of the attitude of a satellite about the earth.
Figure 2A:
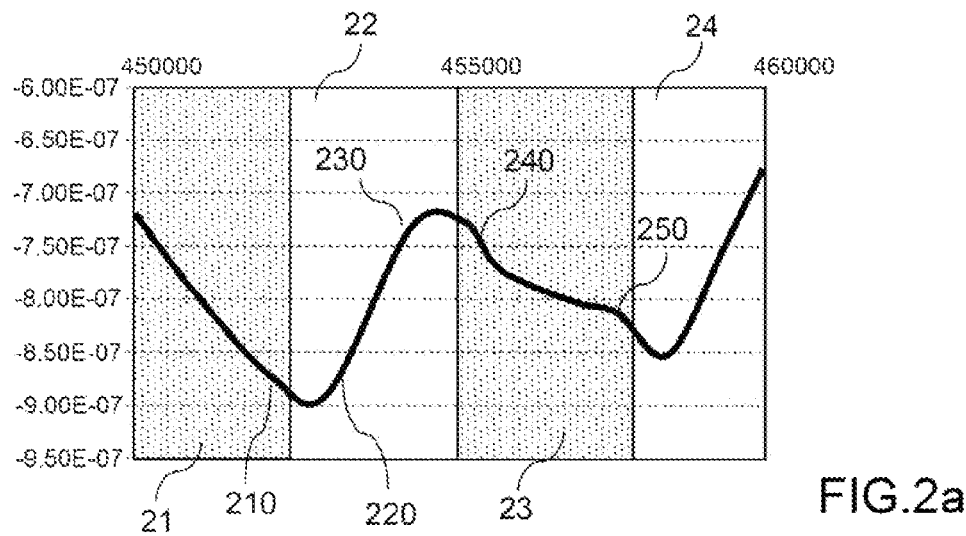
FIG. 2a, an example of a curve representing the variations of the focus on an orbit of a satellite.

FIG. 2 illustrates an example of change in the attitude of a satellite around the earth, the latter being, during an orbit that is mainly in geocentric pointing, shown in FIG. 2 with the letter G, is occasionally in heliocentric pointing, represented by the letter H. FIG. 2a illustrates the change in focusing on a complete orbit of the satellite.

In the context of the present invention, it is considered that the effects of the variations in flux inside the front cavity 105 are dependent on the time periods defining the attitudes of the satellite, that is to say the programming plan of the latter.

It should be observed that the focusing is one of the optical parameters that have the most influence and are the most sensitive in MTF performance.

With reference to FIGS. 2 and 2a, the focusing, shown on the Y axis and expressed in meters, changes as a function of time, shown on the X axis, overall in a periodical manner on an orbit of the satellite. In a first night-time period 21, the focusing reduces continuously up to a first switchover point 210 of the satellite, at which the latter switches to a heliocentric pointing, this switchover substantially coinciding with the beginning of a first daytime period 22. During the first daytime period 22, after a first geocentric switchover 220, the focusing increases continuously up to a second switchover point 230 of the satellite, at which the latter again switches to heliocentric pointing, this switchover substantially coinciding with the beginning of a second night-time period 23. At the beginning of the second night-time period 23, after a geocentric switchover 240, the focusing reduces continuously up to a third switchover point 250 of the satellite, at which the latter again switches to heliocentric pointing, this switchover substantially coinciding with the beginning of a second daytime period 24. During the second daytime period 24, the cycle is repeated. The four periods 21, 22, 23, 24 illustrate two successive orbits in an example of the orbital attitude of the observation satellite.

It should be noted that the embodiments described apply to low orbits of satellites, of the type commonly known by the acronym LEO. These are nonlimiting examples of the present invention, since it is notably understood that the present invention may also apply to satellites travelling along high orbits, of the type commonly known by the acronym GEO or the acronym MEO. In other words, the present invention can apply to satellites known as moving or non-moving.

Figure 3:
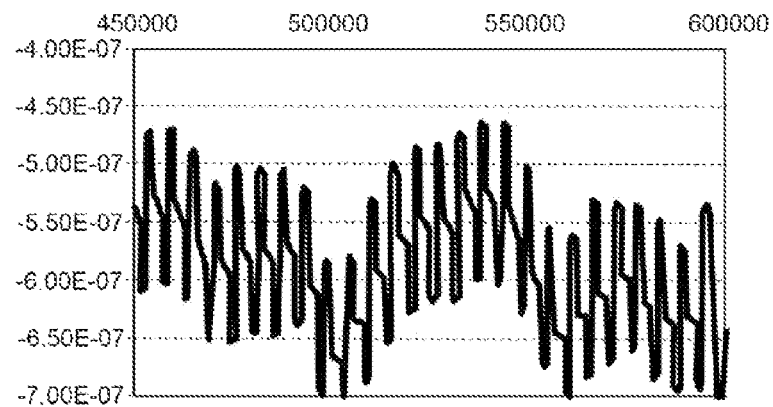
FIG. 3, an example of a curve representing the variations of the focus over a plurality of orbits of a satellite.

FIG. 3, described below, illustrates the variations of the focus over a plurality of orbits of the satellite.

With reference to FIG. 3, the focusing shown on the Y axis and expressed in meters changes over time, shown on the X axis. The variations of the focus are generally periodic over a plurality of orbits that is loaded differently, that is to say having a number of G/H transitions that varies depending on the programming carried out. On each of these orbits, the focusing changes periodically in a manner similar to the change over an orbit shown in FIG. 2a. The low-frequency change that is overlaid is due to the change in the relative cumulative duration between the heliocentric pointing and the geocentric pointing. All these changes are predictable and depend on the programming parameters of the satellite.

The present invention proposes that a correction be made, notably to the focusing parameter, the correction being based on the changes in the focusing over time. The curves of change in focusing, or in other image-quality parameters of the telescope, can specifically be generated with accuracy, based on knowledge of the mission of the satellite, by means of known thermally-coupled, mechanically-coupled and optically-coupled modeling tools. Knowledge of the mission of the satellite includes a knowledge of the positions in orbit—usually known by the acronym PSO—of the latter as a function of dates, and a knowledge of the tilt angles of the satellite. These data can be converted to programming data of the satellite, that can feed an algorithm for determining a priori correction of the thermoelastic effects.

Figure 4:
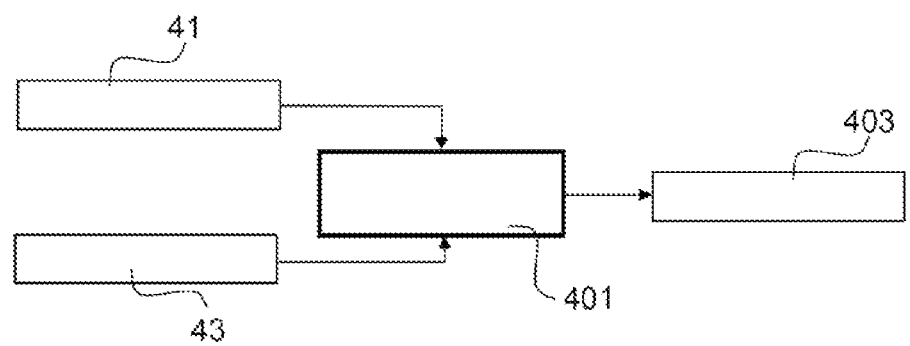
FIG. 4, a diagram illustrating in overview the principle of a correction method according to one exemplary embodiment of the present invention.

A correction method according to the present invention is illustrated by FIG. 4, described below.

With reference to FIG. 4, a correction method may include a step, prior to the flight of the satellite, of determining a priori the correction of the thermoelastic effects 401, using a correction-determination algorithm 25 as introduced above. The determination algorithm 25 receives as an input programming data 41 of the satellite, and allows the application of a prior definition of a model 26 of the thermoelastic variations on the orbital scale. The correction method also comprises a correction step 403 in flight establishing messages for controlling means 30 for correction of the instrument. The correction means 30 may for example comprise means for moving the mirrors of the telescope 1 relative to one another, for example means for moving the secondary mirror 103 of the telescope 1, with reference to FIG. 1 described above. The correction means 30 may also comprise means for deforming the primary mirror 101, or any other optical element.

Thus, the correction method can be defined a priori, in a step prior to the flight, for example of the ground, consisting in determining the correction to be applied to the telescope 1 based on the knowledge of the programming data 41 of the satellite, and the effect of the thermoelastic drifts on the performance parameters of the telescope, such as focusing, can be corrected in flight at all times based on the programming data 41 entered in a step prior to the flight.

Advantageously, on the basis of the same programming data 41, the correction method that can also allow the prediction of the effect of the thermoelastic drifts on the line of sight, that is to say on the stability of the location.

Advantageously, the correction method may also comprise an in-flight resetting step 43 for resetting the correction algorithm in order to alleviate the prediction uncertainties, relative to the data established in advance. The resetting step 43 consisting in resetting the prior model 26 of variations of the thermoelastic effects as a function of measurements taken by appropriate measurement means 40, or more precisely as a function of the difference between the performance parameters in the prior model 26 of variations of the thermoelastic effects and the corresponding performance parameters arising from the measurements carried out by the measurement means 40.

For example, the prior model of variation relating to the MTF can be reset by means of focusing measurements and more generally by specific measurements making it possible to restore all of the Zernike coefficients. The prior model of variation relating to the location can be reset on the basis of the measurements of the difference between the lines of sight, between the line of sight called "instrument" and the line of sight of the star sensors, for example by means of acquisitions on stars.

The resetting that is carried out during the resetting step 43 can be carried out according to the various strategies. For example, according to a first resetting strategy, called long cycle resetting, the resetting can be carried out over determined dedicated periods, for example by means of an in-flight calibration, on an annual basis.

According to a second resetting strategy, called short cycle resetting, the resetting can be carried out for example once per orbit, for example by taking measurements during a daytime half-orbit, and by carrying out a calculation of the new programming data during a night-time half-orbit.

Figure 5:
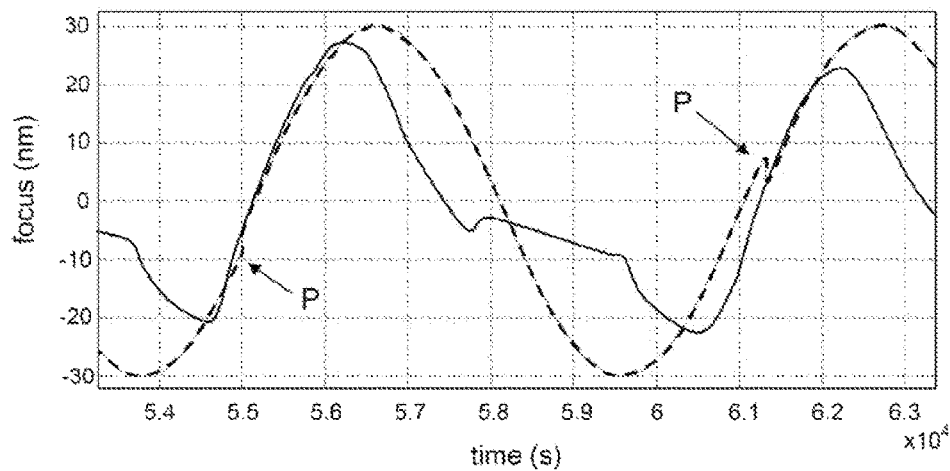
FIG. 5: an example of resetting the prior model of variation of the focus once per orbit, according to the invention.

FIG. 5 illustrates an example of resetting the prior model 26 of variation of focusing, once per orbit. The real variation of focusing during the time is shown in a solid line. The prior model of variation shown in dashed lines is a periodic theoretical predictive model, for example sinusoidal, with an orbital pulsation. A resetting P of the model can be carried out every N orbits where N is an integer greater than or equal to 1, N being selected as a function of the accuracy of correction sought, when an out-of-focus measurement is available.

The resetting strategy can be chosen as a function of the concept of the telescope in question, and of the accuracy of correction sought.

For example, in the context of the second resetting strategy mentioned above, that is to say the short cycle, relatively frequent measurements are necessary and they can for example be taken by specific measurement means placed on board the satellite, such as a wave surface analyzer for example.

For example, in the context of the first resetting strategy mentioned above, that is to say long cycle, it is not necessary to have measurement devices in addition to the measurement devices usually on board in the known instruments associated with space telescopes, and it is notably not necessary to have specific devices such as wave surface analyzers like the secondary resetting strategy, and a limited number of compensators may be sufficient, for example one focusing compensator.

Figure 6:
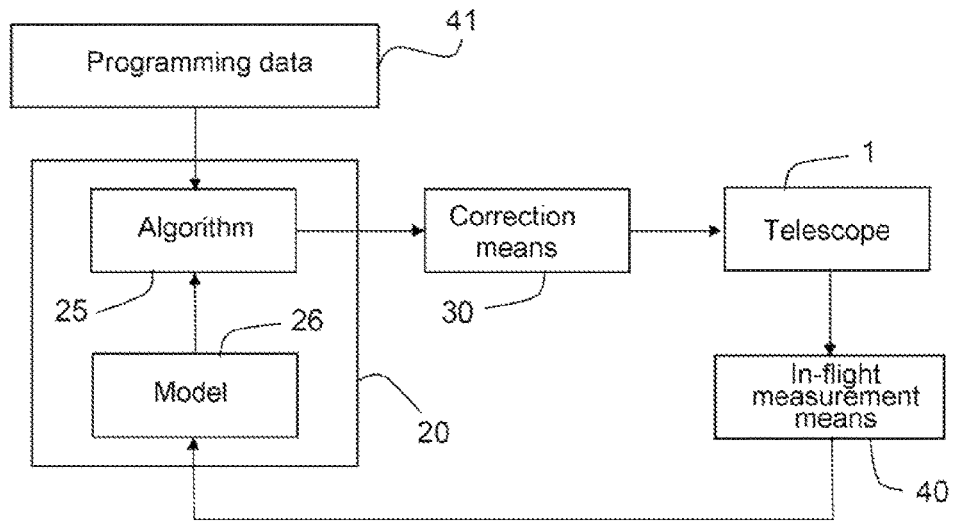
FIG. 6: a block diagram of a device for correcting the thermoelastic effects, according to the invention.

A further subject of the present invention is a device for correcting the thermoelastic effects notably for a space telescope, as shown in FIG. 6, using a method like those in the embodiments described above. The correction algorithm 25 may, for example, be used in dedicated computing means 20 comprising a prior model of variations of the thermoelastic effects that may comprise for example mapping tables giving the laws of change between the controls of the actuators and the attitude parameters of the satellite, the management being able to be carried out by a dedicated computer or by a computer that exists in the satellite 10. A correction device according to the present invention may also comprise correction means 30 associated with the computing means 20 via appropriate interfacing means. A correction device according to the present invention may also comprise measurement means 40 as described above.

A further subject of the present invention is a space telescope, for example as described above with reference to FIG. 1, comprising a correction device according to one of the embodiments described.

One advantage of the present invention is that it requires the use of a thermoelastic effects correction algorithm of simple design that allows the instruments to be reset in flight.

Another advantage of the present invention is that it allows a continuous correction of image quality parameters such as focusing, over the orbit of the satellite.

Another advantage of the present invention is that it makes it possible to increase the elapsed time between the measurement and the correction. Typically, this time may be chosen to be short, for example of the order of 30 minutes in the context of the aforementioned short-cycle strategy, or else very long, for example of the order of six months or even a year, in the context of the aforementioned long-cycle strategy.

Another advantage of the present invention according to certain of its embodiments is that it allows a good knowledge of the stability of the line of sight, the latter being a deciding factor in the context of the use of very high resolution observation systems.

The invention claimed is:

1. A method for changing a configuration of a telescope on board a space satellite to correct thermoelastic effects on performance parameters of the telescope, the method comprising:
    operating one of a dedicated computer and a computer of the space satellite to determine prior to a flight of the space satellite, a priori, a correction of the thermoelastic effects according to:
        a model stored in the one of the dedicated computer and the computer of the space satellite of variations of the thermoelastic effects for an orbital scale of the flight, and
        an algorithm implemented by the one of the dedicated computer and the computer of the space satellite that processes programming data of the space satellite including at least positions of the space satellite for the flight;
    establishing control messages during the flight according to the correction of the thermoelastic effects and operating correction means that change the configuration of the telescopic with the control messages to correct the performance parameters of the telescope, with the one of the dedicated computer and the computer of the space satellite;
    measuring in flight performance parameters of the telescope;
    receiving, with the one of the dedicated computer and the computer of the space satellite, a setting for an accuracy of the correction of the thermoelastic effects;
    determining a value of N with the one of the dedicated computer and the computer of the space satellite according to the setting for the accuracy, where N is an integer greater than or equal to 1;
    determining a difference between performance parameters of the model and corresponding in flight performance parameters from the measuring, with the one of the dedicated computer and the computer of the space satellite; and
    resetting the prior model in the one of the dedicated computer and the computer of the space satellite according to the difference,
    wherein the determining the difference and the resetting the prior model are carried out during the flight, every N orbits of the space satellite.

2. The correction method of claim 1, wherein the performance parameters include a focusing parameter corresponding to a configuration of at least one primary mirror relative to at least one secondary mirror of the telescope.

3. The correction method of claim 2, wherein the prior model of variation of the thermoelastic effects is a periodic predictive model.

4. The correction method of claim 1, wherein said performance parameters include a stability of a line of sight of the telescope.

5. The correction method of claim 1, wherein the measuring includes measuring at least one Zernike parameter.

6. The correction method of claim 1, wherein the measuring is carried out during each orbit of the space satellite.

7. The correction method of claim 6, wherein the measuring is carried out during a first half-orbit of the space satellite, and the resetting of the prior model is carried out during a second half-orbit of the space satellite.

8. The correction method of claim 1, wherein the measuring is carried out over predetermined time periods.

9. A correction device for correcting the thermoelastic effects on performance parameters of a telescope on board a space satellite, wherein said device is configured to operate the one of the dedicated computer and the computer of the space satellite to perform the method as claimed in claim 1.

10. The correction device of claim 9, includes in-flight measurement means for measuring the performance parameters of the telescope.

11. The correction device of claim 9, wherein said correction means includes at least one actuator that moves at least one mirror of the telescope ensuring the movement and/or the orientation of the at least one mirror.

12. The correction device of claim 11, wherein the correction means includes means for deforming the at least one mirror.

13. A telescope for a space satellite, comprising a correction device as claimed in claim 9.

14. The correction method of claim 1,
    wherein the setting for the accuracy is set such that N is equal to 1,
    wherein the measuring the in flight performance parameters is carried out during over a daytime half-orbit of every N orbits, and
    wherein the determining the difference and the resetting the prior model are carried out during a night-time half-orbit of every N orbits.

* * * * *